United States Patent
Hummer

[11] Patent Number: 6,112,680
[45] Date of Patent: Sep. 5, 2000

[54] GRASS TURF TILE LIFTING DEVICE AND METHOD

[75] Inventor: J. Robert Hummer, Mount Joy, Pa.

[73] Assignee: Hummer Sport Surfaces, L.L.C., Lancaster, Pa.

[21] Appl. No.: 09/183,733

[22] Filed: Oct. 30, 1998

[51] Int. Cl.[7] .................................................. A01C 11/00
[52] U.S. Cl. ............................ 111/200; 172/19; 294/128; 111/901
[58] Field of Search ..................... 172/1, 19, 20, 172/21, 615, 622, 635; 111/200, 901; 294/107, 88, 120, 128; 47/1.7

[56] References Cited

U.S. PATENT DOCUMENTS

| | | |
|---|---|---|
| Re. 35,006 | 8/1995 | Ripley, Sr. et al. . |
| 2,572,499 | 10/1951 | Light ........................................ 294/107 |
| 3,326,592 | 6/1967 | Pelton . |
| 3,901,324 | 8/1975 | Fisher . |
| 4,109,729 | 8/1978 | Kaercher, Jr. ............................... 172/1 |
| 4,632,192 | 12/1986 | Hooks . |
| 4,660,650 | 4/1987 | Moak ......................................... 172/21 |
| 4,878,542 | 11/1989 | Brouwer et al. ............................ 172/1 |
| 5,054,831 | 10/1991 | Ting et al. . |
| 5,083,517 | 1/1992 | Stevens et al. .......................... 111/104 |
| 5,165,617 | 11/1992 | Van Vuuren .......................... 172/20 X |
| 5,217,078 | 6/1993 | Zinn . |
| 5,467,555 | 11/1995 | Ripley, Sr. et al. . |
| 5,513,945 | 5/1996 | Hartmann et al. . |
| 5,595,021 | 1/1997 | Ripley, Sr. et al. . |
| 5,673,513 | 10/1997 | Casimaty . |

FOREIGN PATENT DOCUMENTS

| | | |
|---|---|---|
| 2766504 | 1/1999 | France . |
| 662612 | 3/1994 | Japan . |

Primary Examiner—Victor Batson
Attorney, Agent, or Firm—Volpe and Koenig, P.C.

[57] ABSTRACT

An apparatus for securing sections of turf for initial placement, replacement and/or rotation is provided. The apparatus includes a frame adapted for placement on a section of turf. A plurality of spaced apart actuators are mounted to the frame. Each actuator has an actuator rod with a sharpened end which is movable between a first, retracted position and a second, extended position. The actuator rods have an insertion angle of approximately 60° or less with respect to a contact surface such that upon actuation, the actuator rods are moved from the first position to the second position and the sharpened ends of the actuator rods are adapted to pierce the selected section of turf to firmly engage the section of grass turf to the frame for placement or replacement. After the selected section of turf is positioned, the actuator rods are moved from the second position to the first position resulting in the section of turf having a surface which is available for immediate use due to the insertion angle of the actuator rods resulting in reduced overhead observable piercing openings.

15 Claims, 6 Drawing Sheets

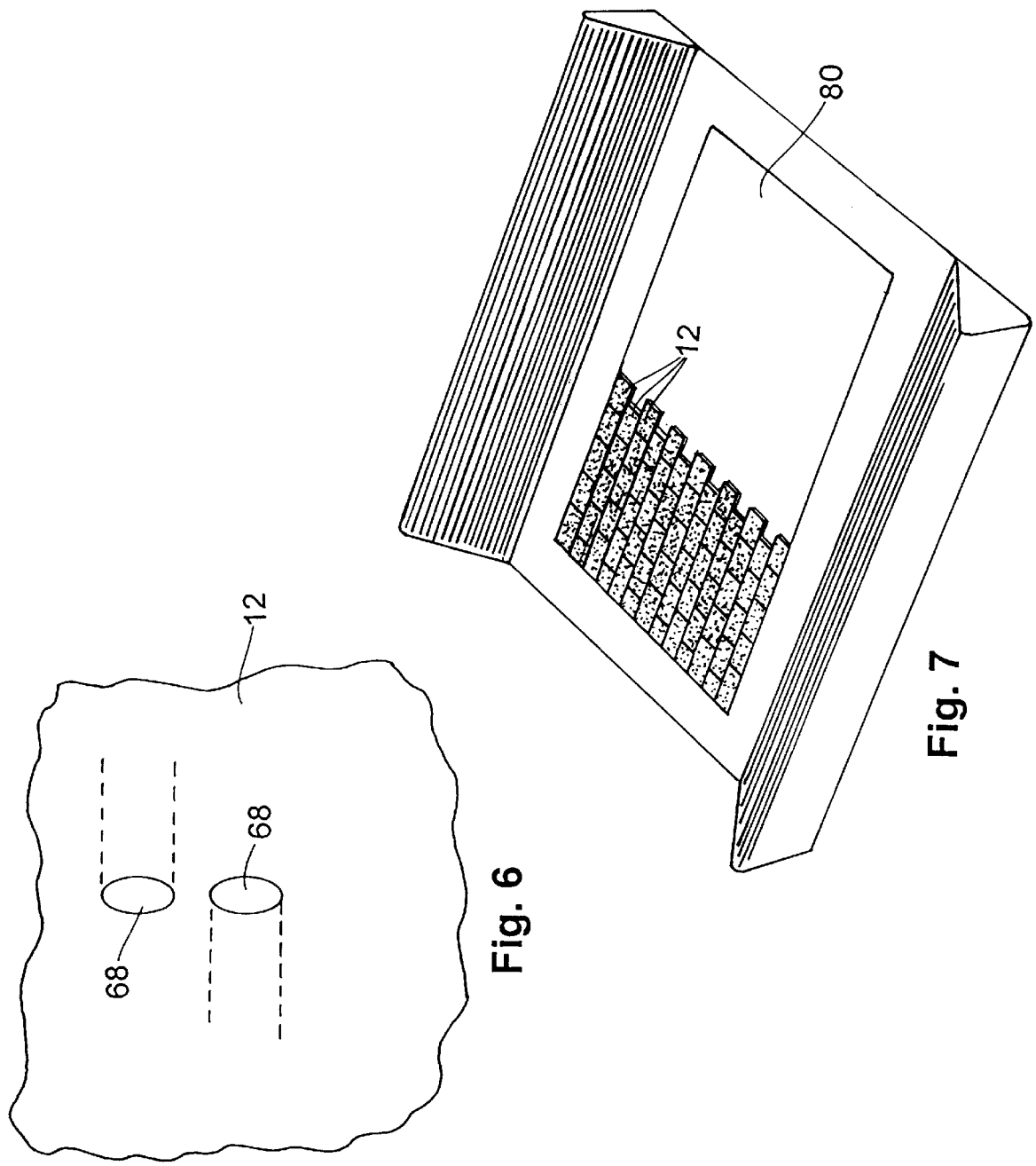

GRASS TURF TILE LIFTING DEVICE AND METHOD

BACKGROUND OF THE INVENTION

The present invention is directed to an apparatus for securing and lifting large sections of grass turf with minimal damage to the grass turf, and more particularly, to an apparatus for securing and placing large standardized turf sections to form and maintain a playing surface of an athletic field.

There has been a movement in professional sports, such as football, to use natural turf surfaces, since a natural turf surface has more give and lowers the risk of injury and the severity of injuries encountered in comparison to playing on artificial turf surfaces. This provides additional protection for the players as well as team owners who incur financial losses when players are injured. However, a drawback to natural turf playing surfaces has always been that once the playing surface becomes worn, it is not possible to maintain a playing field in top condition over the course of an entire season.

Devices for cutting and picking up strips of sod which are then transferred to a truck or trailer for placement at a new location are known. These devices generally involve cutting long strips of sod which are then rolled up and unrolled at a new location, which results in many bumps and joints in the pattern when the sod is placed due to inconsistent depths and multiple handling of the sod. While utilizing strips of sod may be acceptable for residential lawns, it is not suitable for athletic fields.

In order to address this problem one known device has been provided for picking up a large area of sod. The device utilizes a plurality of generally vertical teeth which are attached to a frame. A grass area which is to be picked up is undercut and the frame is then lowered onto the grass area such that the generally vertically oriented teeth penetrate the surface. After the teeth have pierced the sod, alternate rows of teeth are pivoted in opposite directions and assume an inclined orientation to secure the sod to the frame. This allows the sod to be harvested from the area where it was grown and placed in a final position. However, because the teeth penetrate the sod generally vertically and are then shifted to an inclined angle, this can cause damage to the sod, affecting its stability. Additionally, after the lifting device is withdrawn, the holes or openings in the sod have a high overhead observable which may be difficult to close in a relatively short time period utilizing conventional equipment, such as rollers. This makes the surface less desirable for use on an athletic field.

Another known device also allows movement of large turf section in order to replace a damaged portion of an athletic field. The device can be used to move a substantially large piece of turf and includes cutting knives mounted along the edges of a frame to sever the replacement turf from a section of ground, as well as a plurality of semicircular tines which are mounted on parallel shafts. The device is positioned over a desired area of turf to be harvested, and the knife blades are then used to cut the turf free. The shafts are then rotated such that the semicircular tines pierce the surface of the turf in order to secure the turf for subsequent lifting. The replacement section is then used as a permanent replacement for a section of damaged turf which is cut and removed from a playing surface. However, in this known device, the semicircular tines pierce the turf generally vertically, again leaving a greater overhead observable opening once the turf has been placed and the apparatus has been removed. Additionally, the configuration of the curved tine can result in the turf being damaged or buckling if the tine does not insert cleanly, since the tines are spaced apart. The apparatus could also be damaged if the tine strikes a hard object, such as a tree root or a rock.

Another known device is used to place a turf product which is located on a pallet temporarily in position in a track surface or on a portion of an athletic field, such as the infield area of a baseball field which is being converted for use as a football field. The turf/pallet combinations are placed in recesses in the surface which are large enough to accommodate the turf and the pallet. However, this can result in a playing surface which does not have a stable feel, since the temporarily positioned turf areas are supported on hollow pallets. Placement and removal are accomplished by using a forklift which engages the pallet or by cutting holes down through the turf to the pallet such that generally vertically oriented lifting rods can be connected to the pallet.

It would therefore be desirable to provide an apparatus and system which allows for the easy placement and replacement of a natural turf surface on an athletic playing field in which the entire playing surface or a substantial portion of the playing surface is formed from replaceable natural grass turf sections that are stable in use, provide instant playability, and which can be easily and quickly maintained. This would provide the benefit of a natural turf playing surface which can be maintained in top condition throughout an entire season by replacing grass turf sections as they become worn. It would also be desirable to provide an apparatus for securing sections of grass turf for initial placement, replacement and/or rotation between areas of high and low wear which securely holds the section of grass turf during movement, yet causes minimal or no damage to the grass turf and reduced overhead observable openings which can be quickly and easily dressed such that a playing field made from such sections of grass turf can be used immediately, and sections of turf can be replaced quickly when needed.

BRIEF SUMMARY OF THE INVENTION

Briefly stated, the present invention is an apparatus for securing sections of turf for initial placement and replacement. The apparatus includes a frame adapted for placement on a section of turf. A plurality of spaced apart actuators are mounted to the frame. Each actuator has an actuator rod with a sharpened end which is movable between a first, retracted position and a second, extended position. The actuator rods have an insertion angle of approximately 60° or less with respect to a contact surface such that upon actuation, the actuator rods are moved from the first position to the second position and the sharpened ends of the actuator rods are adapted to pierce the selected section of turf to firmly engage the section of turf to the frame for placement or replacement. After the selected section of turf is positioned, the actuator rods are moved from the second position to the first position resulting in the section of turf having a surface which is available for immediate use due to the insertion angle of the actuator rods resulting in reduced overhead observable piercing openings.

In another aspect, the present invention provides a method for placing or replacing a section of turf on a surface. The method includes:

(a) placing a frame of an apparatus for securing a section of turf for initial placement and replacement on a selected section of turf;

(b) actuating a plurality of spaced apart actuators mounted to the frame, each actuator having an actuator rod with a sharpened end which is movable between a first, retracted position and a second, extended position, the actuator rods having an insertion angle of approximately 60° or less with respect to a contact surface, to extend the actuator rods from the first position to the second position;

(c) piercing the selected section of turf with the sharpened ends of the actuator rods and firmly engaging the section of turf to the frame for placement or replacement;

(d) positioning the selected section of turf in a desired position; and (e) moving the actuator rods from the second position to the first position to release the section of turf providing a surface which has reduced overhead observable piercing openings due to the insertion angle of the actuator rods.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 6 is an overhead view of a portion of a section of turf, shown full scale, after removal of the apparatus shown in FIG. 1 showing a theoretical maximum overhead observable piercing openings; and FIG. 7 is a perspective view of an athletic field having a partially installed playing surface of turf tiles.

DETAILED DESCRIPTION OF THE INVENTION

Figure 1:
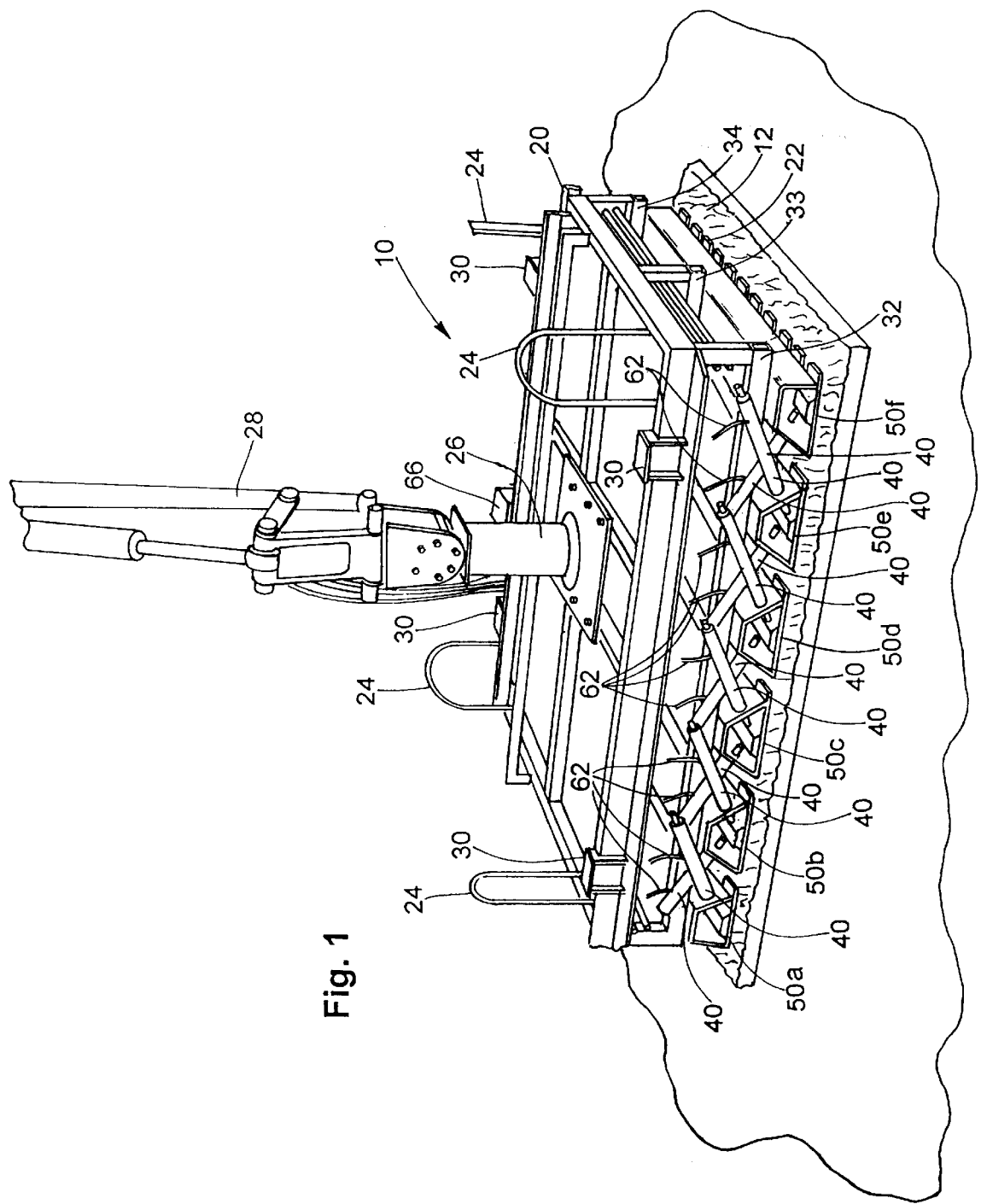
FIG. 1 is a perspective view of an apparatus for securing sections of turf for initial placement and replacement in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the apparatus 10 for securing sections of turf, which are preferably uniformly sized grass turf tiles 12, for initial placement, replacement and/or rotation of turf sections between areas of high wear and areas of low wear, and designated parts thereof. The terminology includes the words specifically mentioned above, derivatives thereof and words of similar import.

Figure 2:
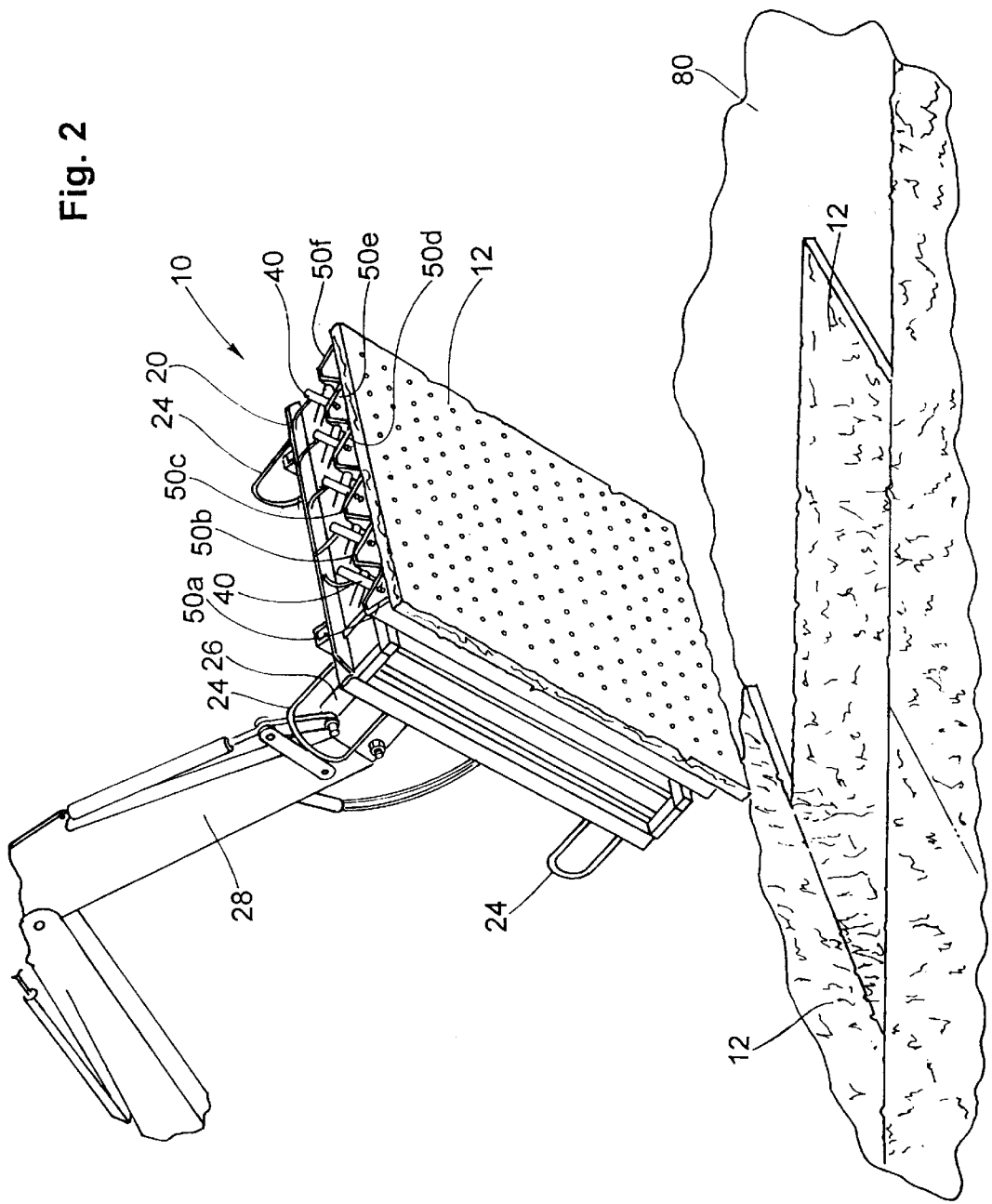
FIG. 2 is a perspective view similar to FIG. 1 showing the apparatus for securing sections of turf placing a section of grass turf in position.
Figure 3:
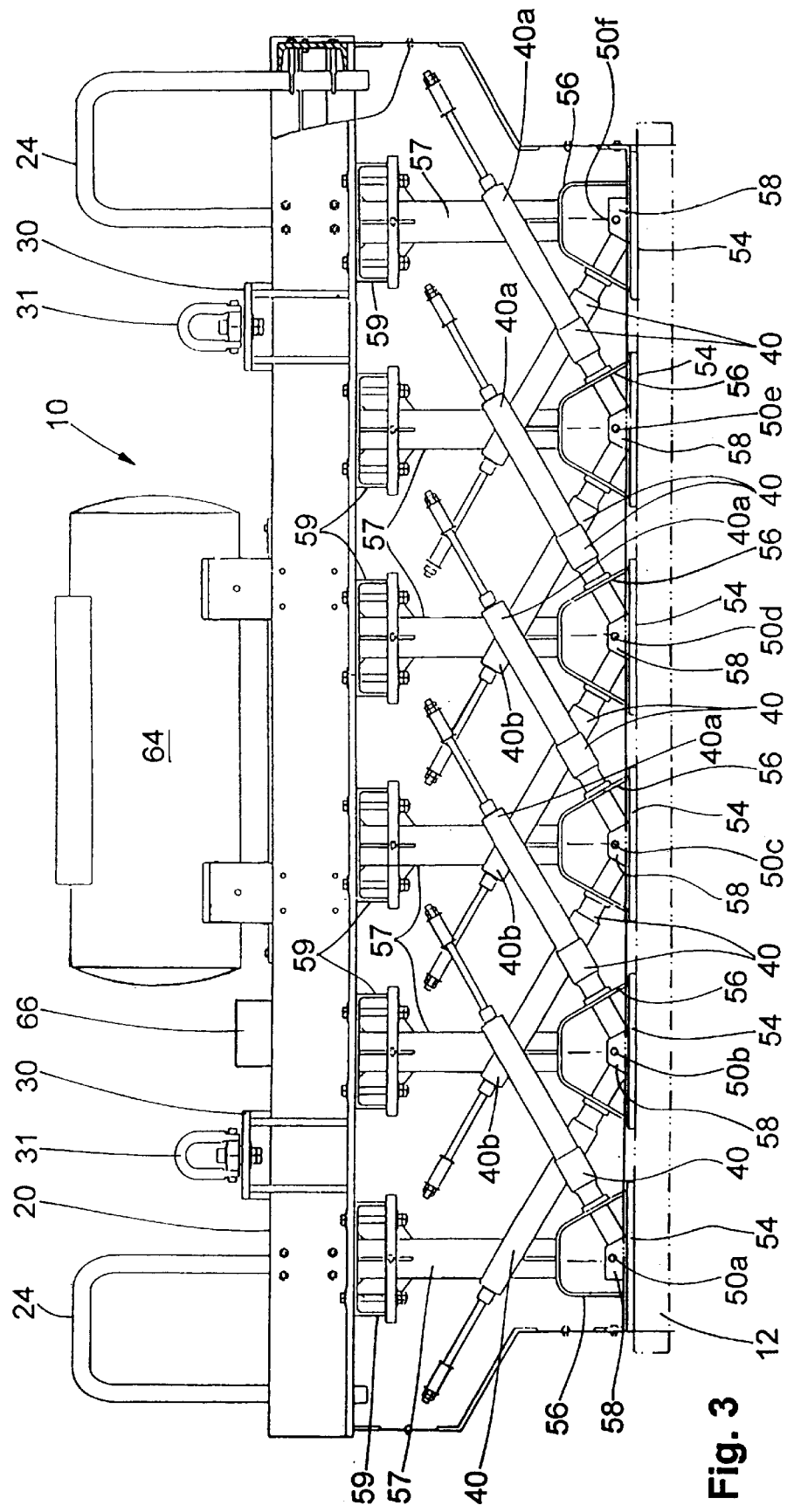
FIG. 3 is a front elevational view of the apparatus shown in FIG. 1.

Referring to FIGS. 1–3, the apparatus 10 for securing sections of turf, such as grass turf tiles 12, for initial placement, replacement and/or rotation is shown in detail. In the preferred embodiment, the grass turf tiles 12 used with the present invention are uniformly sized turf sections which are formed using a selected mixture of soil and shredded carpet material which are mixed together to create an improved stabilized soil base. This material is placed in uniformly sized trays, which are preferably 85 inches square, that are seeded or vegatatively transplanted, for example by sprigging or sodding, and grown offsite from a desired area for use, such as an athletic field in which such grass turf tiles 12 are to be used. The uniform sized trays allow for movement and shipping of grass turf tiles 12 from a remote location to a desired site without disturbing the turf to be used. While the present description will reference the preferred use of grass turf tiles 12, it will be understood by those skilled in the art from the present disclosure that the apparatus 10 can be used in conjunction with any section of turf, which may include grass or other types of vegatative material, such as beach grass or vegetation for erosion control. Additionally, the sections of turf may be used in any suitable application, such as golf courses, horse arenas, land fills or for any desired ground cover.

The apparatus 10 includes a frame 20 adapted for placement on a selected grass turf tile 12. Preferably, the frame 20 is a welded assembly made from aluminum tubes. However, it will be recognized by those skilled in the art from the present disclosure that the frame can be made of other metallic or non-metallic materials of sufficient strength for securing and lifting a grass turf tile 12.

Preferably, handles 24 are located at the four corners of the frame 20 to allow manual manipulation of the apparatus 10. Additionally, as shown in FIGS. 1 and 2, mounting provisions such as a central post 26 may be provided for attachment of the apparatus 10 to the arm 28 of a front end loader to allow manipulation and placement of the grass turf tile 12 as shown in FIG. 2. Preferably, the central post assembly 26 is secured to the frame 20 using bolts or other types of fasteners. The central post assembly can preferably rotate 360° to allow exact positioning of the grass turf tiles 12. Additionally, in the preferred embodiment, the post 26 is pivotable about an axis 27 to allow self leveling. However, it will recognized by those skilled in the art from the present disclosure that the central post 26 could be welded to the frame 20, if desired. Alternatively, lifting lugs 31, as shown in FIG. 3, can be located on the frame 20 at attach points 30 for connection of the apparatus 10 to a fork lift, hoist or other type of lifting device.

As shown in FIGS. 1–3, a plurality of spaced apart actuators 40 are mounted to the frame 20. As shown in detail in FIG. 4, each actuator 40 includes an actuator rod 42 with a sharpened end 44 which is movable between a first, retracted position, as shown in cross section in FIG. 4, and a second, extended position, designated as 42' and shown in dashed lines in FIG. 4. The actuators 40 are preferably positioned at an angle $\alpha$ of approximately 60° or less with respect to a contact surface 22 such that upon actuation of the actuators 40, the actuator rods 42 are moved from the first position to the second position with the sharpened ends 44 of the actuator rods 42 being adapted to pierce a selected grass turf tile 12 to firmly engage the grass turf tile 12 to the frame 20 for placement or replacement.

In the preferred embodiment, the actuators 40 are pneumatic cylinders which utilize air pressure to move the actuator rods 42 between the first and second positions. However, it will be recognized by those skilled in the art from the present disclosure that other types of actuators, such as hydraulic actuators could be utilized, if desired.

Figure 4:
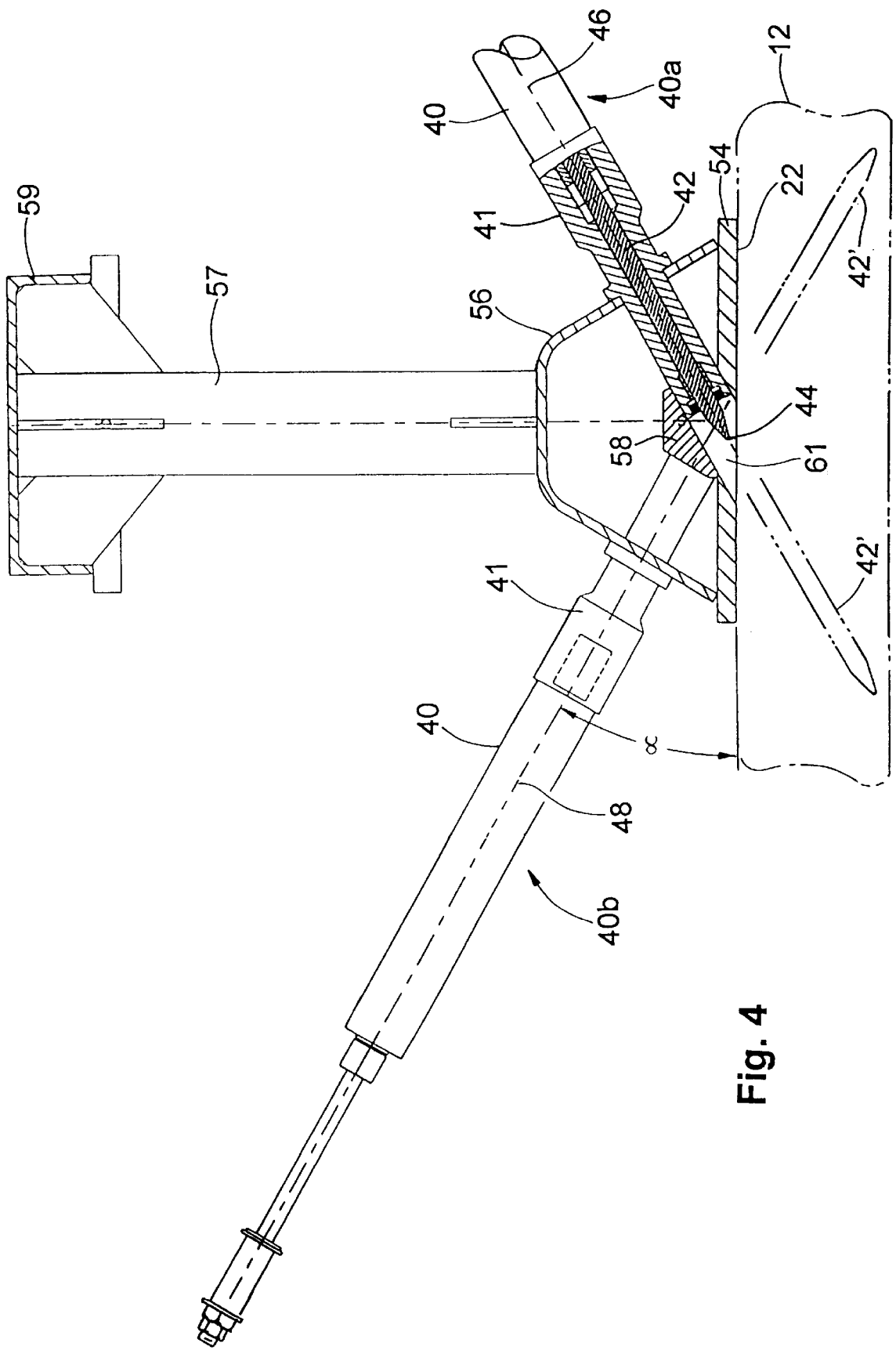
FIG. 4 is an enlarged elevational view partially in cross section showing the positioning of the actuators in the apparatus of FIG. 1.

Preferably, the actuators 40 are arranged in a plurality of rows 50a, 50b, 50c, 50d, 50e, 50f. As shown in detail in FIGS. 3–5, preferably a first group of actuators 40a, including every other actuator 40 in each row 50b–50e, is orientated in a first direction and a second group of actuators 40b, including the remaining actuators 40 in each row 50b–50e, is oriented in an opposite direction to the first direction. The sharpened ends 44 of the actuator rods 42 of the first and second groups 40a, 40b in each row 50b–50e are generally aligned along the respective rows 50b–50e when the actuators 40 are in the first position, as shown in FIG. 4. In the preferred embodiment illustrated, the first and last rows 50a and 50f only include a single group of actuators 40 oriented in one direction, with the actuators 40 in row 50a being oriented in the first direction and the actuators 40 in row 50f being oriented in the opposite direction in order to balance the forces generated between the selected grass turf tile 12 and the apparatus 10 when the actuators 40 are actuated from the first position to the second position. However, it will be recognized by those skilled in the art from the present disclosure that every row 50a–50f may include the first and second groups 40a, 40b of actuators 40 which are oriented in opposite directions, if desired, in order to reduce the stress on the grass turf tile 12 as the actuator rods 42 are moved from the first, retracted position to the second, extended position. While six rows of actuators 40 are provided in the apparatus 10 in accordance with the preferred embodiment of the invention, it will be recognized by those skilled in the art from the present disclosure that the number of rows 50a–f as well as the number of actuators 40 per row 50a–f can be varied to suit particular applications and different size grass turf tiles 12, as desired.

As shown in detail in FIG. 4, each of the actuators 40 in the first group of actuators 40a define parallel first lines of action 46, and each of the actuators 40 in the second group of actuators 40b define parallel second lines of action 48. The parallel first lines of action 46 for each row 50b–50e define a first plane which intersects a second plane defined by the parallel second lines of action 48 in a position above the contact surface 22. This results in the actuator rods 12 penetrating the surface of the grass turf tile 12 from opposite directions along the rows 50b–50e to reduce stresses which could result buckling or tearing in the surface of the grass turf tiles 12.

Figure 5:
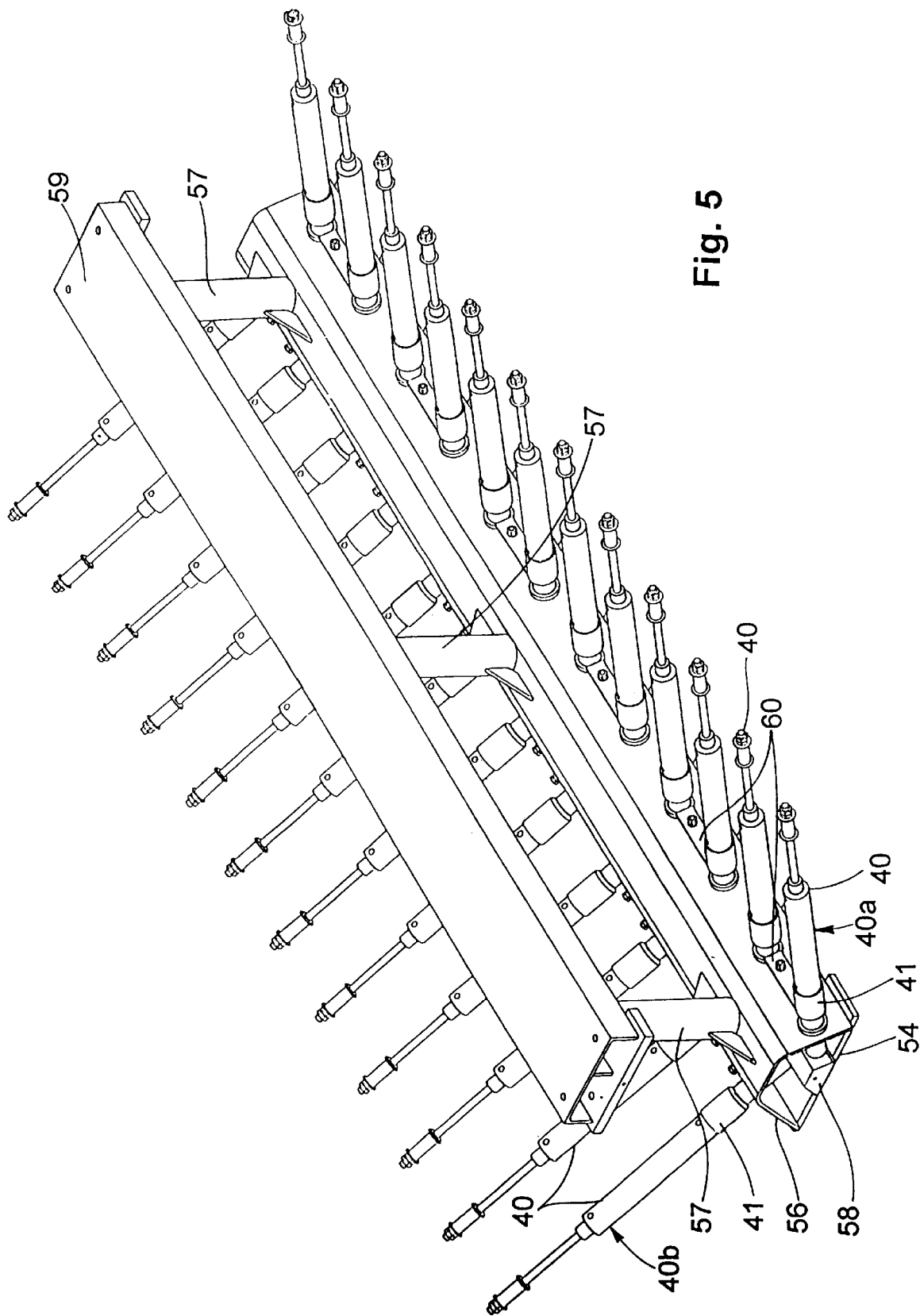
FIG. 5 is a perspective view of one actuator row assembly of the apparatus of FIG. 1.

As shown in detail in FIGS. 4 and 5, preferably, the actuators 40 in rows 50b–50e are located in pairs, with each pair including one actuator 40 from the first group 40a and one actuator 40 from the second group 40b. The spiked ends 44 of the adjacent pairs of actuators 40 extend through openings in a shoe plate 54 located on the contact surface 22 of the frame 20 such that the opposing penetration forces are reacted in a small area while the turf surface is being held in place by the shoe plate 54 so that turf buckling or tearing is prevented. In the preferred embodiment, the spiked ends 44 for each pair of actuators 40 are located approximately 2.0 inches apart in the direction of the rows 50b–50e, and the actuators 40 in each group are spaced approximately 7.0 inches apart from the next adjacent group. The actuator rods 42 are approximately 0.5 inches in diameter. However, the specific arrangement, spacing and size of the actuators 40 can be varied as desired to suit particular applications and the preferred dimensions are only exemplary and are not intended to be limiting.

As shown in FIGS. 4 and 5, preferably the rows 50a–50f of actuators are preferably preassembled as actuator row assemblies 52a–52f. As shown in FIGS. 4 and 5, each actuator row assembly 52b–52e includes an outer support channel 56 which is attached to the actuator housing 41 at a location above the opening through which the actuator rod 42 extends. The inner ends of the actuator housings 41 of each opposing pair of actuators 40 are seated in a support block 58 which is attached to the shoe plate 54. The shoe plates 54 for each pair of opposing actuators 40 are connected to the open end of the outer support channel 56, and define the contact surface 22 of the apparatus 10. This results in a shoe plate 54 being attached to the outer support channel 56 with the support block 58 at each actuator 40 pair position. Preferably, the actuators 40 are slidably insertable through an opening in the outer support 56 and into the support block 58 and are clamped in position using clamping plates 60. This allows the actuators 40 to be easily removed and replaced, as needed. Preferably, upper support posts 57 and an upper support beam 59 are connected to the outer support channel 56 to provide a stable mounting connection to the remainder of the frame structure. While in the preferred embodiment separate shoe plates 54 and support blocks 58 are provided for each opposing pair of actuators 40, which allows access for easier maintenance and inspection, it will be recognized by those skilled in the art from the present disclosure that a single elongated support block 58 and/or shoe plate 54 may be provided for each row 50a–f. Additionally, the specific support arrangement for the actuators 40, while preferred, may be varied to use any suitable mounting arrangement which can securely hold the actuators 40 in position.

For the first and last rows 50a, 50f, a similar arrangement is used which has not been described separately. The only difference is that a single actuator 40 is associated with each shoe plate 54 and support block 58 since all of the actuators 40 in the first actuator row assembly 52a and the last actuator row assembly 52f are inserted from the same side. The actuator row assemblies 52a–52f are preferably attached to the remainder of the frame structure using mechanical fasteners, as shown in FIG. 3. However, it will be recognized by those skilled in the art from the present disclosure that the actuator row assemblies 52a–52f can be attached to the frame 20 by other methods, such as welding, if desired. It will be similarly recognized by those skilled in the art from the present disclosure that the actuator row assemblies 52a and 52f which include actuators 40 oriented in only a single direction could be replaced with actuator row assemblies similar to 52b–52e having opposing pairs of actuators 40, if desired.

As shown in detail in FIG. 4, when the actuator rods 42 are in the first retracted position, the sharpened ends 44 of the actuator rods 42 are retracted into a recessed area 61 formed in the shoe plate 54 and the support block 58 such that the sharpened ends are not exposed.

As shown in FIG. 1, air hoses 62 are attached to each actuator 40 and are connected to a source of pressurized air. As shown in FIG. 3, preferably an air pressure reservoir 64 in the form of a pressure tank is located on the frame 20 in order to provide a sufficient supply of pressurized air to actuate all of the actuators 40 at one time. A controller 66 for controlling the supply of pressurized air to the actuators 40 is provided. The controller 66 utilizes control valves (not shown) of the type known in the art in order to supply pressurized air to the actuators 40 when required to actuate the actuator rods 40 between the first, retracted position and the second, extended position. A remote control may be provided to allow an operator to operate the controller 66 for the control valves remotely, either using a cable connected control panel or using an HFor other type of transmitter and receiver for remotely signaling the controller 66. It will be recognized by those skilled in the art from the present disclosure that the type of controller and control valves may be varied, as desired.

In the preferred embodiment, the actuators 40 are oriented at an angle α of 60° or less with respect to the first surface 22, and preferably are located at an angle α of 30° in order to provide a reduced overhead observable opening 68 in the surface of the grass turf tile, as shown in FIG. 6. By providing a low insertion angle α of 60° or less and preferably 30°, the openings 68 created by the sharpened ends 44 of the actuator rods 42 penetrating the surface of the grass turf tile 12 are reduced in size and do not appear to be as large as the holes created by direct overhead, generally vertical penetration. Additionally, due to the low insertion angle α of the actuator rods 42, the penetration openings 68 are more easily closed by rolling the surface of the grass turf tile 12 after it has been placed resulting in a surface which is ready for immediate use.

In the preferred embodiment, the apparatus 10 is used for placing, replacing and/or rotating sections of turf, such as the grass turf tiles 12 on a surface, such as an athletic field 80, as shown in FIGS. 2 and 7. The frame 20 of the apparatus 10 for securing grass turf tiles 12 is placed on a selected grass turf tile 12 for initial placement or replacement. The plurality of spaced apart actuators 40 mounted to the frame 20 are actuated such that the sharpened end 44 of the actuator rod 42 for each actuator 40 extends from the first position to the second position. The sharpened ends 44 of the actuator rods 42 pierce the selected grass turf tile 12 and firmly engage the grass turf tile 12 to the frame 20 for placement or replacement.

Preferably, the apparatus 10 is connected to a front end loader or other type of conveying apparatus, such as a fork truck in order to move the selected grass turf tile 12 which is connected to the frame 20 via the engaged actuator rods 42 of the actuators 40 to a desired position. Once the selected grass turf tile 12 is positioned, as shown in FIGS. 1 and 2, the actuator rods 42 are moved from the second position to the first position to release the grass turf tile 12. The apparatus 10 allows very accurate positioning of the turf tiles 10 to achieve minimum seams. The now placed grass turf tile 12 has a surface that has reduced overhead observable piercing openings 45, as shown in FIG. 6, which are easily closed by rolling the grass turf tiles 12 in order to close the piercing openings 45, as well as any minor gaps between adjacent tiles 12.

In the preferred embodiment, as shown in FIG. 7, the grass turf tiles 12 are approximately seven feet square and are used to create a stable and natural playing surface for an athletic field. However, it will be recognized by those skilled in the art that it can be used for other types of turf or vegatative material, such as for erosion control, horse arenas, or other ground cover applications. Creating an athletic field surface in this manner allows selected grass turf tiles 12, such as those between the hash marks on a football field between the twenty yard lines to be quickly and easily replaced when they are damaged or worn. Alternatively, they can be rotated to other areas of the athletic field that do not receive high wear, outside the hash marks or in the end zones. The apparatus 10 is located over a selected grass turf tile 12 on the playing field and secured to the selected grass turf tile 12. The grass turf tile 12 can be removed to an area off the athletic field where the grass turf tile can be reseeded and allow to regenerate, or placed in a low wear area of the athletic playing field. Fresh replacement grass turf tiles 12 can be installed in the same manner as described above in connection with the initial placement of the grass turf tiles 12, allowing for immediate playability.

Because any of the grass turf tiles 12 on the athletic field which become worn can be easily replaced utilizing the apparatus 10, it is possible to provide a durable playing surface which is always in good condition and is stable in use, yet provides the give of natural turf in order to protect athletics from serious injuries such as those encountered when playing on artificial turf surfaces due to the lack of give of the playing surface. Because the grass turf tiles 12 are preferably grown in trays, a uniform size and thickness is easily obtainable which allows for easier and faster initial placement, replacement and/or rotation since it is not necessary to physically cut the turf tiles 12 loose from an existing turf surface. Additionally, since the turf tiles 12 are placed directly upon a prepared field surface, which is preferably a sand base, no special pallets or other substrate is required to allow removal and replacement of the grass turf tiles 12 since the apparatus 10 can be easily maneuvered into position over a selected grass turf tile 12 after it has been installed for removal and replacement.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for securing a selected section of turf for at least one of initial placement, replacement and rotation, comprising:

a frame adapted for placement on the selected section of turf; and a plurality of spaced apart actuators mounted to the frame, each actuator having an actuator rod with a sharpened end which is movable linearly between a first, retracted position and a second, extended position, the actuator rods have an insertion angle of approximately 60° or less with respect to a contact surface such that upon actuation of the actuators, the actuator rods are moved linearly from the first position to the second position such that the sharpened ends of the actuator rods are adapted to pierce the selected section of turf to firmly engage the selected section of turf to the frame for placement or replacement, and after the selected section of turf is positioned, the actuator rods are moved from the second position to the first position leaving the section of turf with reduced overhead observable piercing openings.

2. The apparatus of claim 1 wherein the actuators are arranged in a plurality of rows, with a first group of actuators including every other actuator in the plurality of rows being oriented in a first direction and a second group of actuators including the remaining actuators in the plurality of rows being oriented in an opposite direction to the first direction, the sharpened ends of the actuator rods of the first and second groups in each of the plurality of rows being generally aligned along the row when the actuators are in the first position.

3. The apparatus of claim 2 wherein each of the actuators in the first group of actuators define parallel first lines of action, and each of the actuators in the second group of actuators define parallel second lines of action, the parallel first lines of action for each row defining a first plane which intersects a second plane defined by the parallel second lines of action in a position above the contact surface.

4. The apparatus of claim 1 wherein the actuators are located in adjacent pairs, with each pair including one actuator from a first group oriented in a first direction and one actuator from a second group oriented in an opposite direction to the first direction, the sharpened ends of the adjacent pairs of actuators extending through a shoe plate such that opposing penetration forces are reacted and turf buckling is prevented.

5. The apparatus of claim 1 wherein in the first position, the sharpened ends of the actuator rods are retracted into a recessed area in the frame.

6. The apparatus of claim 1 wherein the actuators are pneumatically actuated.

7. The apparatus of claim 6 wherein a pneumatic pressure reservoir is attached to the frame and connected to the actuators.

8. The apparatus of claim 1 wherein the actuators are oriented at an angle of about 30° with respect to the contact surface.

9. The apparatus of claim 1 wherein each of the actuators includes an actuator housing which is removably secured to the frame.

10. The apparatus of claim 2 further comprising a first row of actuators and a last row of actuators located on opposite sides of the actuators in the plurality of rows, the first row of actuators including a third group of actuators oriented in the first direction, and the last row of actuators including a fourth group of actuators oriented in the opposite direction to the first direction.

11. A method of placing or replacing a selected section of turf on a surface, comprising:

(a) placing a frame of an apparatus for securing the selected section of turf for initial placement or replacement on the selected section of turf;

(b) actuating a plurality of spaced apart actuators mounted to the frame, each actuator having an actuator rod with a sharpened end which is linearly movable between a first, retracted position and a second, extended position, the actuator rods having an insertion angle of approximately 60° or less with respect to a contact surface, to extend the actuator rods from the first position to the second position;

(c) piercing the selected section of turf with the sharpened ends of the actuator rods and firmly engaging the selected section of turf to the frame for placement or replacement;

(d) positioning the selected section of turf in a desired position; and (e) moving the actuator rods from the second position to the first position to release the selected section of turf providing a surface which has reduced overhead observable piercing openings due to the insertion angle.

12. The method of claim 11 further wherein a plurality of sections of turf are provided, the plurality of sections of turf are uniformly sized grass turf tiles, the method further comprising placing a plurality of adjacent grass turf tiles using the apparatus; and rolling the grass turf tiles to at least partially close the piercing openings and gaps between adjacent tiles.

13. The method of claim 12 further wherein the plurality of adjacent grass turf tiles are placed on a surface to form an athletic field, the method further comprising:

replacing selected grass turf tiles which are damaged or worn using the apparatus for securing grass turf tiles and installing fresh replacement grass turf tiles using the apparatus.

14. The method of claim 12 further wherein the plurality of adjacent grass turf tiles are placed on a surface to form an athletic field, the method further comprising:

rotating selected grass turf tiles which are damaged or worn using the apparatus for securing grass turf tiles to an area of the athletic field having lower wear.

15. An apparatus for securing a selected section of turf for at least one of initial placement, replacement and rotation, comprising:

a frame adapted for placement on the selected section of turf;

a plurality of spaced apart actuators mounted to the frame, each actuator having an actuator rod with a sharpened end which is movable between a first, retracted position and a second, extended position, the actuator rods have an insertion angle of approximately 60° or less with respect to a contact surface such that upon actuation of the actuators, the actuator rods are moved from the first position to the second position such that the sharpened ends of the actuator rods are adapted to pierce the selected section of turf to firmly engage the selected section of turf to the frame for placement or replacement, and after the selected section of turf is positioned, the actuator rods are moved from the second position to the first position leaving the section of turf with reduced overhead observable piercing openings;

the actuators being arranged in a plurality of rows, with a first group of actuators including every other actuator in the plurality of rows being oriented in a first direction and a second group of actuators including the remaining actuators in the plurality of rows being oriented in an opposite direction to the first direction, the sharpened ends of the actuator rods of the first and second groups in each of the plurality of rows being generally aligned along the row when the actuators are in the first position.

* * * * *